Sept. 18, 1956 D. T. DOBROGOWSKI ET AL 2,763,486

AUTOMATIC RECORD CHANGER FOR VARIOUS RECORD SIZES

Original Filed July 20, 1949

6 Sheets-Sheet 1

Inventors
DANIEL T. DOBROGOWSKI
RALPH M. ROEN
By ROBERT H. JONES

Wheeler, Wheeler & Wheeler
Attorneys

Sept. 18, 1956 D. T. DOBROGOWSKI ET AL 2,763,486

AUTOMATIC RECORD CHANGER FOR VARIOUS RECORD SIZES

Original Filed July 20, 1949 6 Sheets-Sheet 2

Inventors
DANIEL T. DOBROGOWSKI
RALPH M. ROEN
By ROBERT H. JONES
Wheeler, Wheeler & Wheeler
Attorneys DANIEL T. DOBROGOWSKI
RALPH M. ROEN
ROBERT H. JONES
Inventors By Wheeler, Wheeler & Wheeler
Attorneys

AUTOMATIC RECORD CHANGER FOR VARIOUS RECORD SIZES

Original Filed July 20, 1949

6 Sheets-Sheet 4

Inventors
DANIEL T. DOBROGOWSKI
RALPH M. ROEN
ROBERT H. JONES
By Wheeler, Wheeler & Wheeler
Attorneys Inventors
DANIEL T. DOBROGOWSKI
RALPH M. ROEN
By ROBERT H. JONES
Wheeler, Wheeler & Wheeler
Attorneys Inventors
DANIEL T. DOBROGOWSKI
RALPH M. ROEN
ROBERT H. JONES
By Wheeler, Wheeler & Wheeler
Attorneys

United States Patent Office 2,763,486

Patented Sept. 18, 1956

2,763,486

AUTOMATIC RECORD CHANGER FOR VARIOUS RECORD SIZES

Daniel T. Dobrogowski, Milwaukee, Ralph M. Roen, Greenfield, and Robert H. Jones, West Allis, Wis., assignors to Milwaukee Stamping Company, Milwaukee, Wis., a corporation of Wisconsin

Original application July 20, 1949, Serial No. 105,864. Divided and this application October 23, 1950, Serial No. 191,682

4 Claims. (Cl. 274—10)

This invention relates to an automatic record changer for various record sizes. The present application is a division of our companion application 105,864, filed June 20, 1949, now Patent No. 2,662,772.

It is a primary object of the invention to provide a record changer capable of handling all commercial sizes of records and capable of releasing them from the storage stack in the same manner of each ejection regardless of thickness or diameter of the record. There are currently three sizes of records which are respectively seven inch, ten inch, and twelve inch records and the records, even of like dimensions, operate at different playing speeds. It is a relatively simple matter to provide different driving speeds for the turntable, but the center apertures of some of the records are relatively small and the center apertures of others are relatively large and consequently no one has heretofore been able to provide a single escapement mechanism for delivering single records to playing position from the storage stack. In such devices as are capable of handling the different types of records at all, two different escapement mechanisms have been provided for the large and small hole records.

It is a further major object of the present invention to provide a novel velocity trip mechanism for initiating the record change at the conclusion of a playing operation. It is customary to initiate the record changing operation when the tone arm reaches a given angular position in the course of its following of the record groove. It is customary to accelerate the movement of the tone arm to record changing position by changing the pitch or lead of the record groove at the conclusion of that portion thereof which bears the sound track. However, in the event that the sound track is unusually long or the changer is not properly adjusted, the changing operation may be initiated before the playing of the record has been completed. The present invention overcomes this difficulty by an arrangement in which the changing mechanism is set in operation when the record groove is increased in its pitch or lead, and the record changing operation is thus made entirely independent of the angular position of the tone arm at the time so that it will immediately follow the conclusion of the playing of the record whether the record is long or short.

In connection with the object first stated above, it is a further object of the invention to provide a record changer with interchangeable spindles for the large and small aperture records respectively, the different spindles being respectively keyed so that the insertion of one or the other will automatically condition the apparatus for the return of the tone arm to the record in a position appropriate to start the playing of the particular type of record involved.

It is a further object of the invention to provide a friction bearing for positioning the tone arm after it is released by the positive stop and until substantially the moment when the stylus contacts the record. In an automatic changer, there must be stops which, in the various types of records, will positively fix the position to which the tone arm will return above the record preliminary to a playing operation. Such stops must, obviously, be taken from the path of the associated part of the tone arm before playing commences, and in the course of this process, the tone arm has heretofore swung with entire freedom, it being particularly important in the so-called micro-groove records that there be no resistance whatever to tone arm movement. In order that the record may be entirely free during playing and may nevertheless be held under control while it is being lowered to the record, it is a purpose of the present invention to provide friction brake mechanism functioning only during the lowering operation after the positive stop is ineffective and before playing commences.

Still other objects will be apparent to those skilled in the art from the following disclosure of our invention with particular reference to the accompanying drawings.

Figure 1:
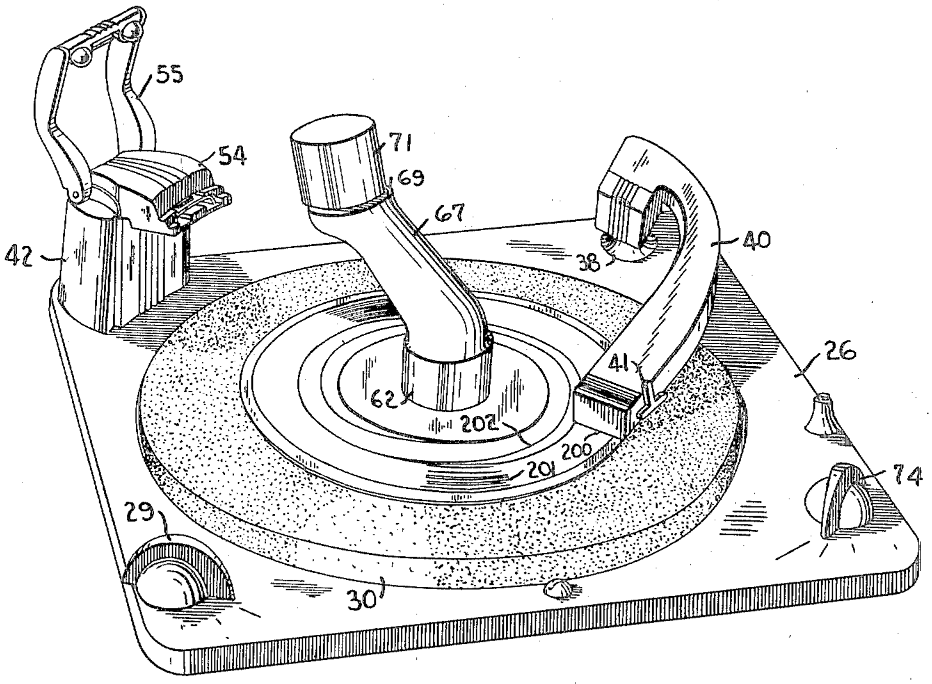
Fig. 1 is a view in top perspective of a record changer embodying our invention.
Figure 4:
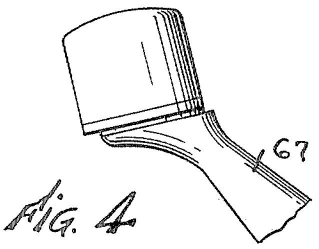
Fig. 4 is a fragmentary detail view in side elevation of the top of the escapement spindle.

Since much of the record changer mechanism illustrated is old in itself, and one of the difficult objectives of the present invention has been to provide for the playing of new types of records with a minimum of changes in existing record playing equipment, it will be necessary to describe much that is old before the novel features of the present invention can be appreciated. It is proposed first, to locate and identify the principal features of the record changing mechanism of the type with which this invention is principally concerned. Thereafter the various parts will be described and their structure and mounting will be detailed from the standpoint of their operation during the normal cycling of the machine. Description of the operation of known parts of the mechanism will be condensed and those features which are new will be pointed out in the course of the description.

The bed 26 conventionally supports a driving motor 27 having a friction wheel at 28 which, through means constituting no part of the present invention may be driven at different speeds subject to the control of a knob 29 for the actuation of the turntable 30 at speeds appropriate for the various types of records. The turntable has a hub 31 journaled on a tubular stud 32 carried by bed 26. For driving the changing mechanism from the motor 27, the under side of the turntable is provided with a spiral cam 33 which is known commercially as a scroll. Pivoted on the pintle 34 on the under side of bed 26 is the lever 35 which is known commercially as a swing arm and which carries at opposite sides of the turntable axis cam follower rollers 36 and 37 which may be raised or lowered as occasion requires to engage the scroll for operation thereby to oscillate the swing arm in one direction or the other, the roller 37 being elevated into the scroll cam in Fig. 2.

Near one corner of the bed is the pedestal 38 upon which is pivoted the tone arm 40 which carries at its free swinging end the usual pickup or pickups (in this case two separate styli, not shown, are used for the different types of records), a choice therebetween being made by means of the lever 41 (Fig. 1). Near another corner of the bed 26 is the ejector stand 42 which supports the margins of the stored stack of records and cooperates with the escapement spindle for ejection of the lowermost record of the stack to playing position each time the record changer operates.

Figures 6, 7:
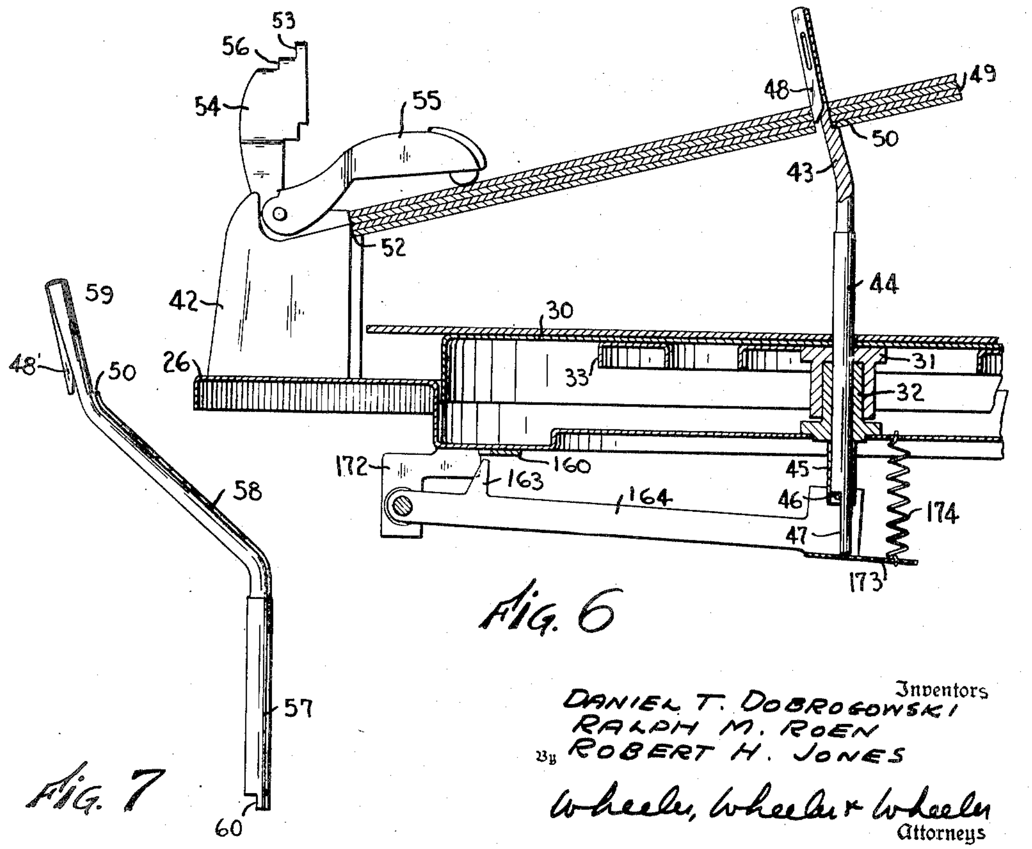
Fig. 6 is a view similar to Fig. 3 showing the parts in association with an escapement spindle for conventional small aperture records.
Fig. 7 is a detail view in side elevation of an interchangeable escapement spindle used for small diameter micro-groove records with small central apertures.

The record spindle 43 shown in Fig. 6 handles the older or standard type of ten and twelve inch records with small central openings, this being the record commonly reproduced at a playing speed of 78 R. P. M. It also handles "microgroove" or "LP" records with 1/4" center holes and 10" or 12" diameters for operation at 33 R. P. M. The spindle is inclined with respect to its vertical supporting pin 44, the latter extending through an aperture in the turntable and through the bearing stud 32 into a sleeve at 45 beneath the bed 26 which sleeve has a cross pin 46 engaging the flat face 47 of the pin 44 to key the pin in a position of orientation such that its spindle 43 is inclined toward the ejector column 42. A dog at 48 in the upper part of the spindle terminates just above the lowermost record in the stack 49 (12 inch records being illustrated in Fig. 6) and provides, at its lower end, a shoulder which is exposed downwardly and is offset above the shoulder 50 for a distance only slightly in excess of the thickness of the record. When the ejector mechanism hereinafter to be described pushes the lowermost record away from the pedestal 42 and toward the axis of the turntable, the remaining records in the stack do not move with the ejected record and the latter, upon clearing shoulder 50, drops on to turntable 30 for reproduction.

Figure 3:
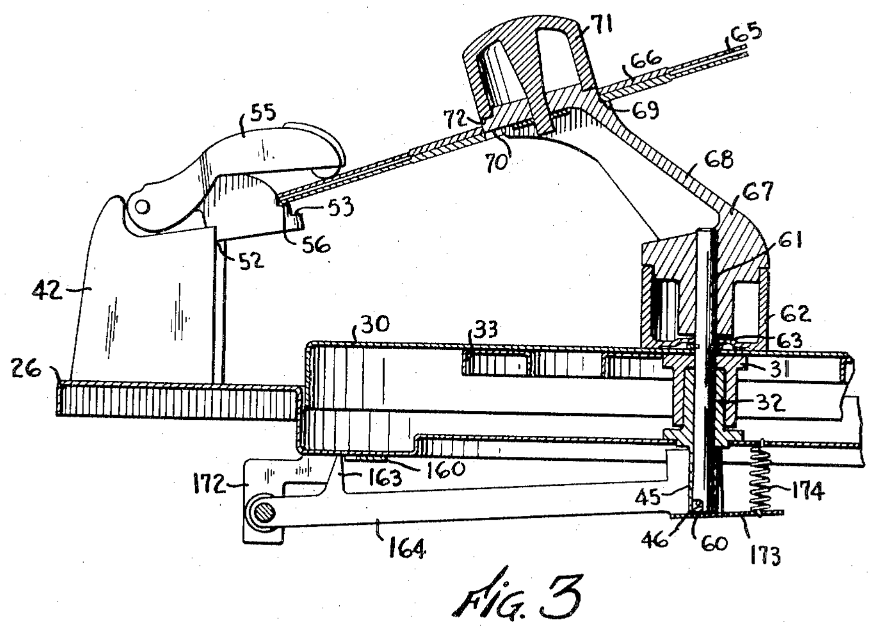
Fig. 3 is a view in transverse axial section through the turntable and a special escapement spindle used for large apertured, small diameter micro-groove records, most of the detailed operating structure beneath the turntable being omitted for clarity.

In addition to the central support derived from the shoulder 50, the records in stack 49 rest on one of several shelves provided on the ejector pedestal 42. In the case of the twelve inch records shown in Fig. 6, the margins rest upon the shelf 52. In the case of conventional, small hole ten inch records, the margins of such records are supported on the shelf 53 of the auxiliary head 54 with which the ejector column 42 is provided. This head is movable between the inoperative or retracted position in which it is shown in Fig. 6 and the operative position in which it is shown in Fig. 3. To assist in maintaining the record stack 49 immobile upon the supports provided at 50 and 52 (or 53) a pivoted hold-down device 55 is used on the column for movement between the operative positions shown in Figs. 3 and 6 and an elevated position which exposes the shoulder for the introduction of new records.

So far as the apparatus has thus far been described, it is all of known construction. However, for the purpose of playing the new seven inch thin records playable at 45 R. M. P., we provide an additional step or shelf at 56 in the auxiliary head 54 and a substitute center post which is shown in Fig. 7 and comprises a pin portion 57, an offset portion 58 which compensates for the difference in diameter of the records, bringing the center of the stack closer to the column 42 of the ejector, and an upper end portion 59 which is identical in angle and construction with that of the device shown in Fig. 6, having the same shoulders 50 and a similar dog at 48', which, however, may be fixed rather than pivotal. The flattened lower extremity 60 of the pin portion 57 of this device is much shorter than that shown in Fig. 6 on the pin 44 and in this respect is conventional, the flattened portion of the pin 44 being elongated for purposes connected with the present invention and hereinafter to be described.

The large hole seven inch micro-groove records are carried on a third center post shown in Fig. 3. The margin of the lowermost record in the stack still rests on the new shelf 56 provided on the pivoted auxiliary head 54 of the ejector column 42. The pin portion 61 of the center post shown in Fig. 3 is substantially identical with the pin portion 57 of the device shown in Fig. 7, having the same short flattened lower end 60.

Figure 5:
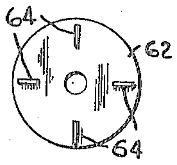
Fig. 5 is a detail view in inverted plan of the lower end of the escapement spindle.

However, this pin portion extends through a cup-shaped driving element 62 which is rotatably mounted thereon, being confined by a spring ring 63 set into a groove in pin 61. The lower face of the driving cup 62 desirably has means for increasing its frictional driving engagement with the surface of the turntable, shallow radial teeth 64 being preferred for this purpose, as shown in Fig. 5. As clearly shown in Fig. 3, the cross sectional form of the large hole seven inch record is such that the record groove is cut in a peripheral record portion 65 of a reduced thickness, leaving only a relatively small diametered central portion 66 for bearing engagement with the turntable. In order that such portion need not receive frictional drag through contact with any stationary part, the cup is made to rotate with the turntable, thereby assisting rather than retarding the assured rotation of the record with the turntable.

Carried by the pin 61 of the center post above the driving cup 62 is the center post member 67 which guides the record to its proper position on the turntable and may conveniently be molded of synthetic resin or the like. It includes an inclined offset portion 68 of such length and inclination as to hold the stack of seven inch records in a position where the margin of the lowermost record will ride on the shelf 56 as already described. There is a shoulder at 69 corresponding in structure and function with the shoulder 50 shown in the center post devices of Figs. 6 and 7. Opposite the upwardly facing shoulder 69, and spaced above for slightly more than the thickness of the record portion immediately adjacent the hole is a downwardly facing shoulder 70 best illustrated in Fig. 3. The cap 71 merely constitutes an upward extension of the center post to position the uppermost records of the stack and to guide them to the ejection position at the bottom of the stack. The surface 72 immediately beneath the cap and above shoulder 70 holds the second lowermost record against displacement while the lowermost record is being pushed laterally in the course of ejection to clear shoulder 69 and thereupon to ride down the inclined surface 68 to be guided on to the turntable and about the driving cup 62 for reproduction.

The three center post devices shown in Figs. 3, 6 and 7 are interchangeable. Any one of them may be freely withdrawn or inserted in a vertical axial direction. Each of them is restrained from rotation by the cross pin 46 above described and each of them provides a central support for the record which is correctly spaced with reference to the ejector column and is so designed as to function like an escapement to permit ejection of the bottom record from the bottom of the stack into playing position. Although the large hole seven inch records were designed for delivery from the reserve stack under control of an escapement mechanism housed entirely within the central supporting post, the novel device shown in Fig. 3 enables even these records to be delivered subject to the control of the same ejector which actuates all the other types of records. The specific ejector mechanism is changed but slightly from conventional practice and will be described in connection with a discussion of a playing cycle.

Figure 2:
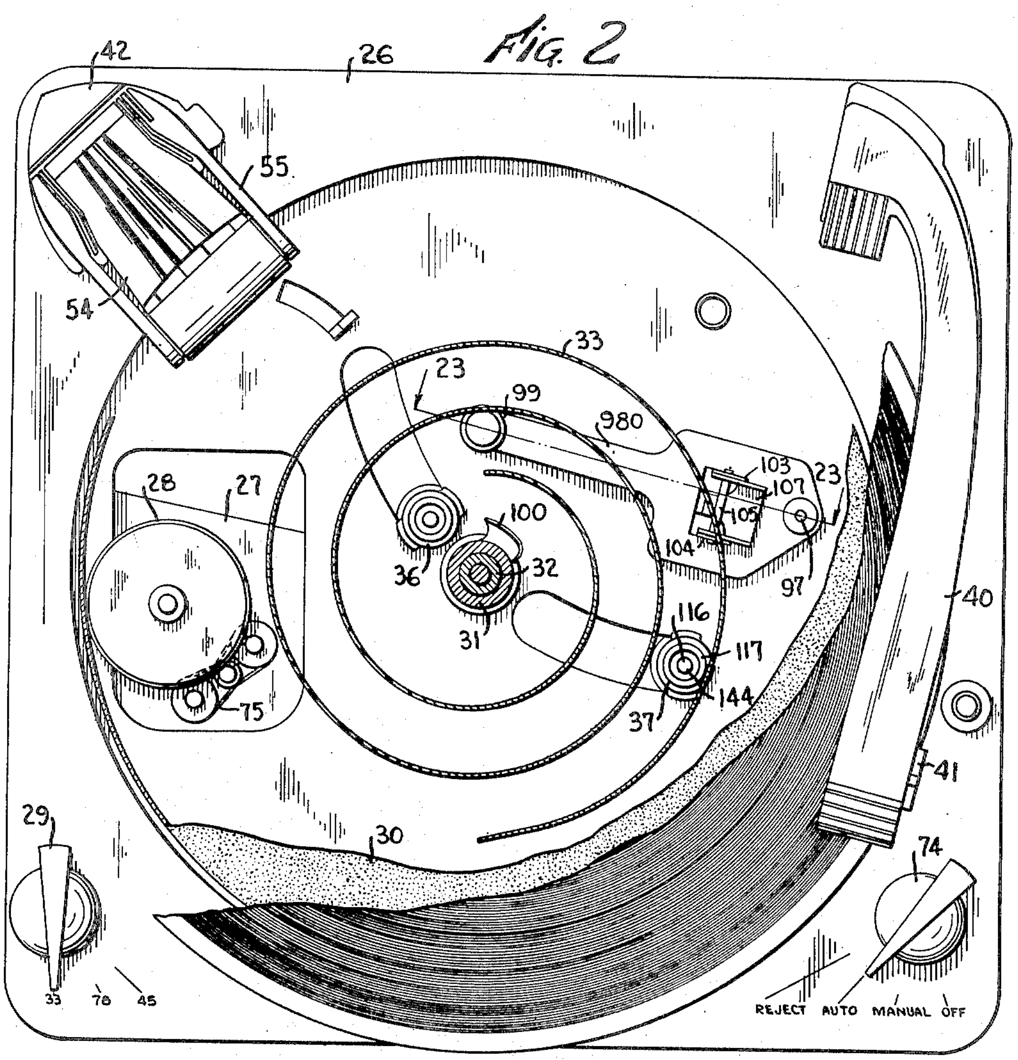
Fig. 2 is a view of the apparatus in plan, portions thereof being broken away.

Having inserted the center post appropriate for the type of records to be played, the operator loads a stack of such records on to the upper end of the center post, as indicated in Fig. 3 or Fig. 6, and turns the control knob 74 from the "off" position indicated in Fig. 2 through the manual position and the automatic position to the reject position, which it occupies momentarily to initiate the cycle, being thereafter returned either to automatic or manual. The knob 29 will previously have been set to the correct driving speed which it achieves by means of speed controlling mechanism which is no part of the present invention but is generically designated by reference character 75 in Fig. 2 and is operated by arm 76 and bell crank 77 shown in Fig. 8.

Figure 8:
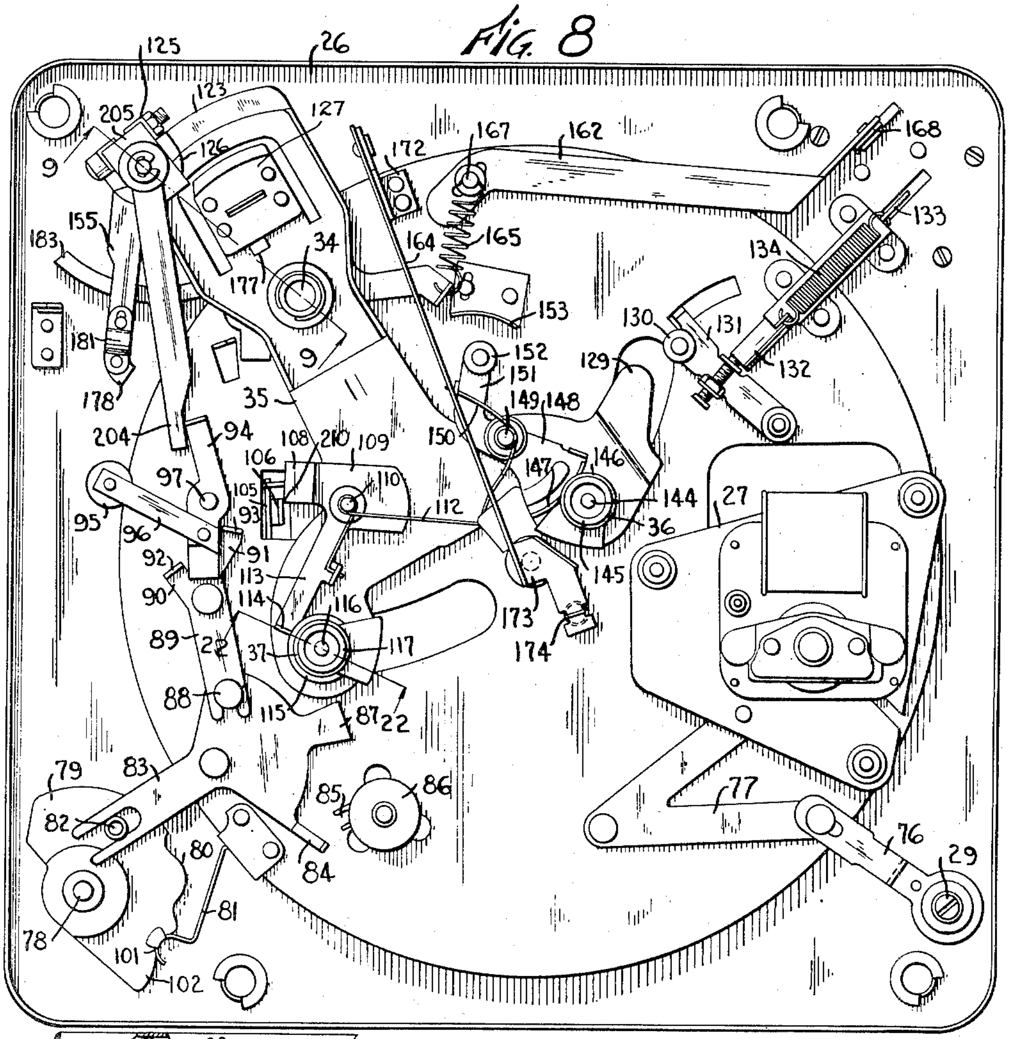
Fig. 8 is a view of the record changing apparatus in inverted plan.

In Fig. 8, the control shaft actuated by the knob or control 74 above described is designated at 78. It is connected beneath the bed 26 with a crank disk 79 which has a cam surface 80 acted on by detent spring 81 to define the various positions of the control 74. The pin 82 on crank disk 79 engages the slotted end of lever 83 which is shown in the position of the control which is marked "Auto" in Fig. 2. A finger 84 on lever 83 is so positioned that in its initial movement from its "off" position shown in Fig. 8 it will have engaged the notched end of the actuating lever 85 of the motor control switch 86 to start the motor in operation. The switch is shown in its closed position. Another finger 87 on the lever 83 functions only for the purpose of permitting manual and non-automatic operation of the reproducer and will not be described because the present invention is not concerned therewith. The pin 88 on lever 83 has transmitted motion to a lever 89 which is bifurcated, having arms 90 and 91 with upturned fingers 92 and 93 at their respective ends which are disposed at opposite sides of the floating lever 94 for the transmission of motion from lever 89 to lever 94 without any such positive connection as would restrain lever 94 from complete freedom of oscillatory movement within the limits defined by the spacing between fingers 92 and 93. In order to increase the inertia of lever 94 to resist accidental movements induced by vibration, while leaving such lever entirely free for intended movement, this lever is desirably provided with a weight 95 at the end of an arm 96.

The lever 94 forms part of the novel velocity trip mechanism which is one of the major features of present invention. It is fixed on the lower end of a rock shaft 97 (Fig. 23) which rotates freely in a bushing 98 carried by the bed 26. This rock shaft extends to a position above the bed, where it carries the arm 980 (Figs. 2 and 23) which has at its free end a cam follower roller 99 positioned to coact with a cam 100 on the hub portion 31 of the turntable 30.

It will be recalled that Fig. 8 shows the parts in the position for automatic record changing, the detent spring 81 being engaged in the notch 101 of the cam disk 79 on the control shaft 78. The detent spring 81 resists displacement of the cam disk 79 to the reject position indicated by the mark "Reject" on the face of the bed 26. In the course of movement from the position shown in Fig. 8 to the rejection position, the detent spring will ride on to the elevated surface 102 of the cam disk 79 with thrust sufficient to tend to return the cam disk to the position illustrated in Fig. 8. Consequently, the control knob can be held in the reject position only by continued exercise of manual torque thereon.

In the course of the exercise of such torque, the finger 93 on lever 89 will oscillate rock shaft 97 clockwise as viewed in Fig. 8 and counterclockwise as viewed in Fig. 2, thereby moving the free end of arm 98 toward the axis of the record turntable. This lever is apertured and adjacent the aperture are the ears 103, 104 (Fig. 2 and Fig. 23), which support a pintle 105 for the trip dog 106. The transversely extending end 107 of this dog serves as a weight tending to bias the dog counter-clockwise from position shown in Fig. 23, but the dog is readily displaceable in clockwise oscillation from the position shown in Fig. 23.

Figures 23, 24, 25, 26:
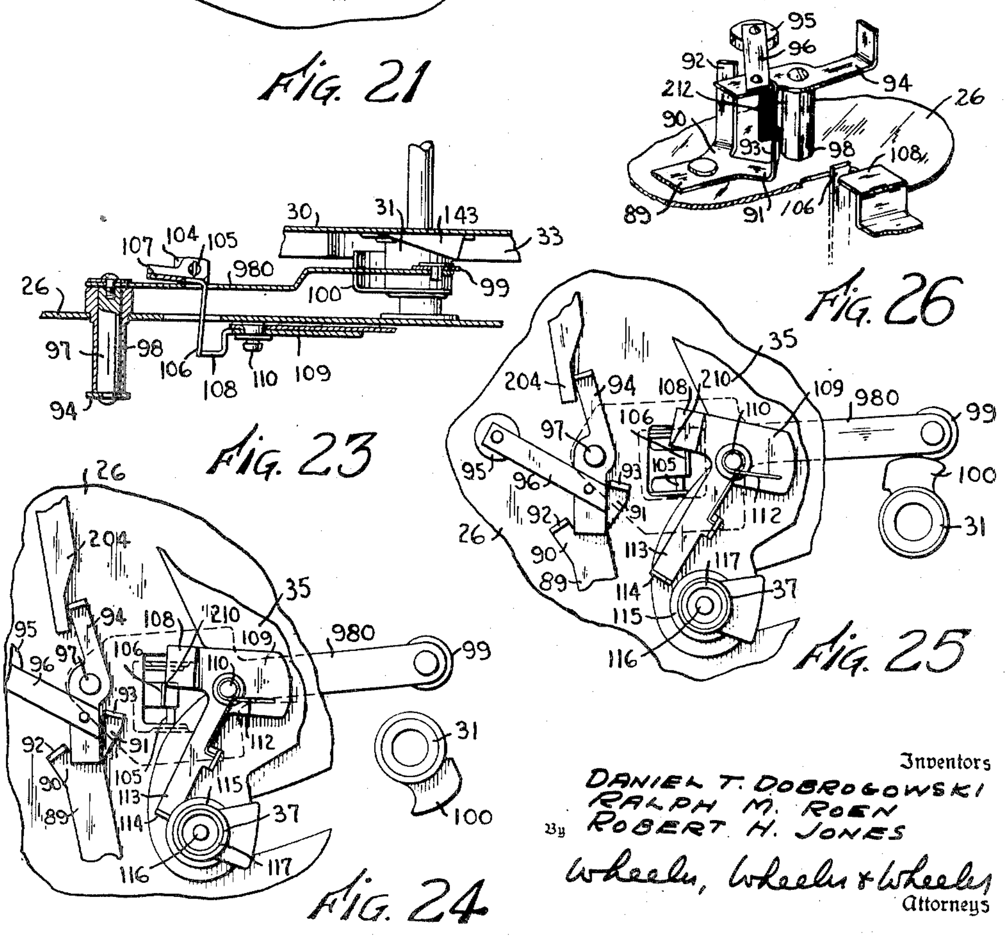
Fig. 23 is a fragmentary detail view taken in section on the line 23—23 of Fig. 2.
Fig. 24 is a fragmentary detail view in inverted plan of portions of the velocity trip mechanism, fragments of the bed being shown and other portions thereof broken away to expose the cam on the turntable hub.
Fig. 25 is a view similar to Fig. 24 showing the same parts in different positions.
Fig. 26 is a fragmentary detail view in perspective showing portions of the mechanism illustrated in Figs. 24 and 25.

In the position in which the dog is illustrated in Fig. 23, it lies in the path of the arm 108 of a lever 109 which, in turn, is pivoted at 110 to the swing lever 35 and is biased by the spring 112 to the position shown in Fig. 8. Another arm 113 of the lever 109 has a depending finger 114 (Figs. 8, 22 and 25) which serves as a detent normally engaging the collar 115 to hold down the upwardly biased pin 116 which is mounted on the swing lever 35 and carries the cam follower roller 117 which, when released, is forced upwardly by compression spring 118 to engage in the cam scroll 33 on the under side of the turntable. Thus, the operator's movement of the control knob to the reject position, by causing lever 94 to move clockwise, permits dog 106 to drop behind the side of arm 108. When cam 100 next strikes roller 99 on lever 980, the oscillation of such lever trips lever 109, thereby permitting the driving pin 116 to spring upwardly to engage the roller 117 in the scroll of the turntable, which is in motion, and which feeds the roller 117 toward the turntable axis, thus oscillating the swing lever 35 counterclockwise as viewed in Fig. 8. The motion of the swing lever is effective, as will now be explained, to lift the tone arm, swing it aside, eject the first record in the stored stack 49 for delivery to turntable and, finally, to set up a means by which the motion of the swing arm is reversed and the tone arm is delivered to proper position above the record and is lowered into playing engagement therewith.

Figure 9:
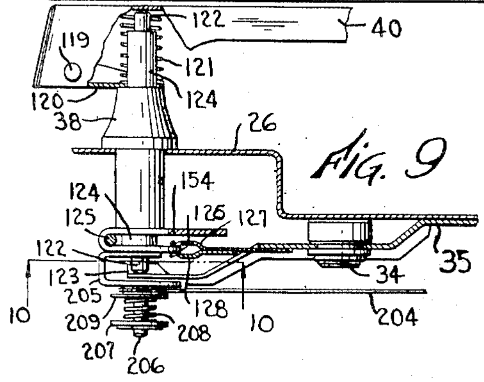
Fig. 9 is a fragmentary detail view partially in side elevation but largely in transverse section on the line 9—9 of Fig. 8.
Figure 11:
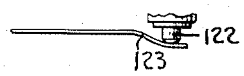
Fig. 11 is a fragmentary detail view in end elevation of the cam surface of a so-called swing arm which constitutes the actuating member for the record changing apparatus.

The tone arm 40 must first be raised, as, in ordinary ejection, it might have its stylus in contact with the sound groove of a record. Fig. 9 shows the tone arm in playing position, its stylus being supported on a record or on the turntable. The tone arm is freely oscillatable on the pintle 119 which connects it to a bracket 120 swiveled on the tone arm supporting posts 38. A counterbalancing spring 121 carries some of the weight of the tone arm which is biased by gravity in opposition to such spring. Extending down centrally through the supporting post 38 is a push rod 122, the lower end of which is exposed as shown in Fig. 9 and Fig. 11 to be engaged by a cam surface at 123 on the end of the swing lever 35 which projects outwardly beyond its fulcrum 34. Consequently, the initial oscillation of the swing lever in response to its actuation by the scroll 33 as above described will involve the engagement of cam 123 with the push rod 122 which, acting on the under surface of the channeled tone arm 40 will overcome the gravity bias of the tone arm and lift the free end thereof.

Figure 10:
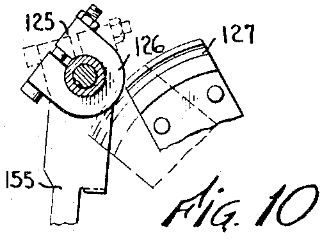
Fig. 10 is a detail view taken in section on the line 10—10 of Fig. 9.

For the swinging movement of the tone arm bracket 120 upon the post 38, the bracket is mounted on a hub or bushing 124 which extends downwardly through the tone arm post 38 and carries a clamp 125 which includes a disk or segment 126, the free margin of which is exposed to be engaged between spring fingers 127 and 128 carried by the swing lever 35 as shown in Figs. 8, 9 and 10. These fingers are in such proximity that as they engage the segment 126 they are spread thereby and their resilient bias exerts a frictional driving torque upon the hub or bushing 124 tending to oscillate such bushing and, with it, the bracket 120 and the tone arm, the direction of oscillation being such as to swing the tone arm aside to fully expose the turntable.

Figures 12, 15, 16, 17, 18, 19, 20:
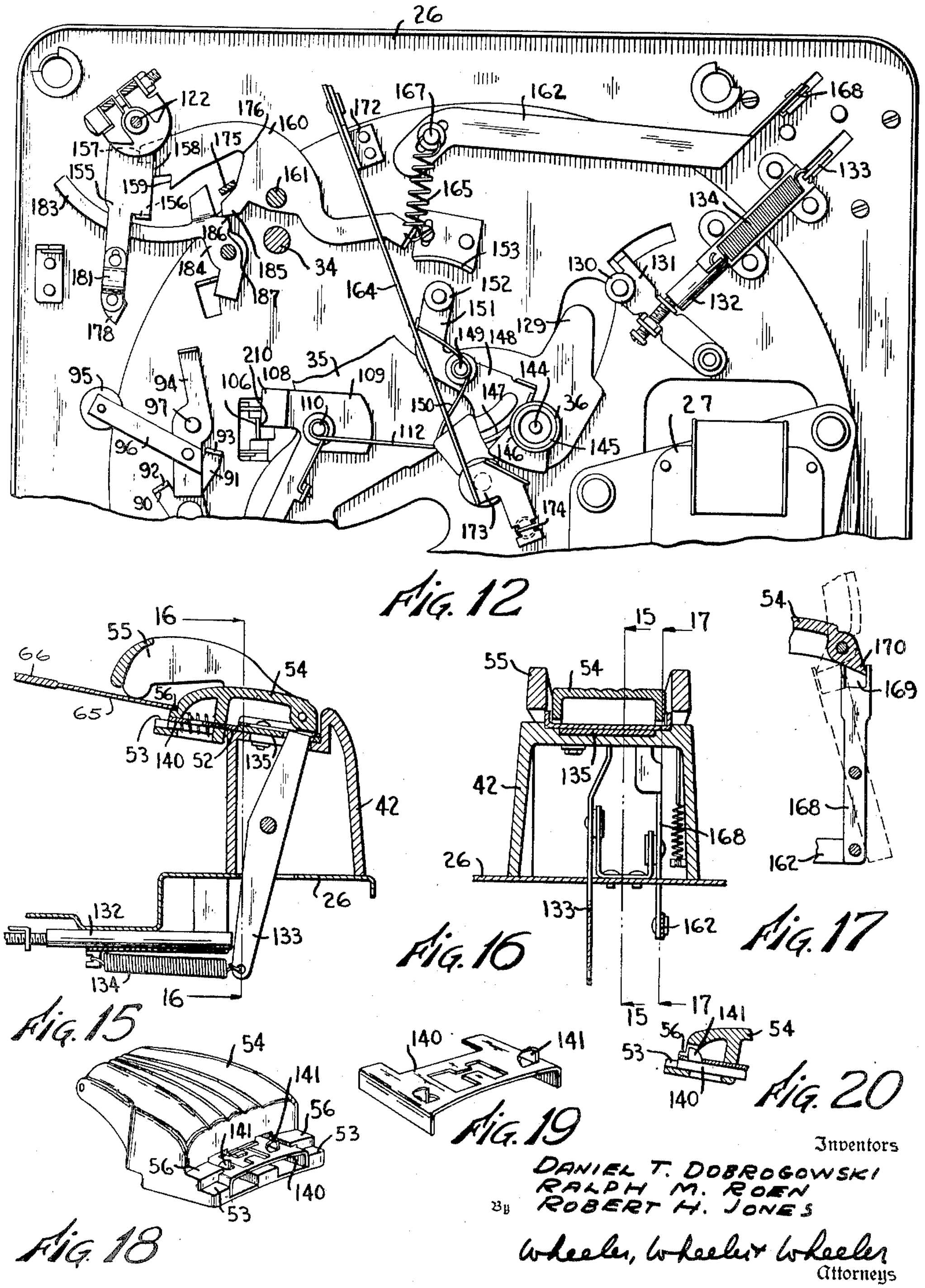
Fig. 12 is a fragmentary view in inverted plan showing some of the mechanism illustrated in Fig. 8 as such mechanism appears with the so-called swing arm and other parts largely broken away.
Fig. 15 is a fragmentary detail view taken in section on line 15—15 of Fig. 16 through the ejector stand.
Fig. 16 is a detail view taken on the line 16—16 of Fig. 15.
Fig. 17 is a detail view taken in section on line 17—17 of Fig. 16.
Fig. 18 is a detail view in perspective of the adjustable saddle plate and record ejecting slide mounted therein.
Fig. 19 is a detail view in perspective of the slide.
Fig. 20 is a detail view in transverse section through a fragment of the saddle plate and slide shown in Figs. 18 and 19.

The initial movement of the swing lever having elevated the tone arm, and its continuing movement having swung the tone arm aside, the swing lever now operates the record ejecting mechanism to release a record from the stored stack. For this purpose, the swing lever is provided with a lateral extension 129 (Fig. 8) which acts on the roller 130 of lever 131 to reciprocate the rod 132 (Fig. 8) thereby actuating lever 133 (Fig. 15) against the tension of spring 134. This lever has its remote and engaged in a slot in the ejector plate 135, whereby the oscillation of the lever moves the ejector plate forwardly to push a twelve inch record from the shelf or shoulder 52, the thickness of the plate being no greater than the thickness of the record disk, whereby only the lowermost record of the stack is acted upon, the remaining records being fixed against frictional movement by the dog 43 of the record post shown in Fig. 6.

Where any seven or ten inch record with ¼ inch center hole is to be handled by the apparatus, the auxiliary head 54 is lowered to the position shown in Fig. 15 whereby the supporting shelf or shoulder 53 is made available at the proper radial distance from the center post 43 or 58. To transmit the motion of the ejector 1135 to such a record, the head 54 is provided with a slide 140 which is separately illustrated in Fig. 19 and is shown assembled in the head of Fig. 18 and Fig. 20. This slide has the form of a channel with its transverse web uppermost in the plane of the ejector plate 135, so that the slide is acted upon by the ejector plate in the same manner as the twelve-inch record was acted upon, the slide serving to transmit the motion of the ejector plate to the ten-inch record to push the latter from the shelf or shoulder 53.

Assuming that the post shown in Fig. 3 for the 45 R. P. M. type of seven-inch records is in use, the greater offset of the post enables the seven-inch record to be positioned on the ejector column in a manner such that the margin of this seven-inch record rests on the shelf or shoulder 56 (see Figs. 3, 15 and 18). As above noted, this shelf or shoulder is new for the purposes of the present invention and, in order to permit a record to be ejected therefrom in a manner corresponding to the ejection of other records, the slide 140 is provided for the purposes of this invention with upstanding lugs at 141 for which the head 54 is relieved to provide clearance. Thus, the forward movement of the slide 140 will eject any record supported either on the shoulders 53 or 56 of the head 54, whether such records be ten-inch records or seven-inch records.

The record released will immediately be guided down the inclined portion of the center post between the stack supporting portion thereof and the mounting pin and will be deposited in playing position on the rotating turntable 30. It is now necessary to reverse the direction of oscillation of the swing lever 35 in order to return the tone arm to a proper position over the record to initiate the reproduction thereof and it is necessary to predetermine such position with considerable accuracy, having in mind the dimensions and type of record. The means by which the direction of oscillation of the swing lever is reversed will first be described.

Figure 21:
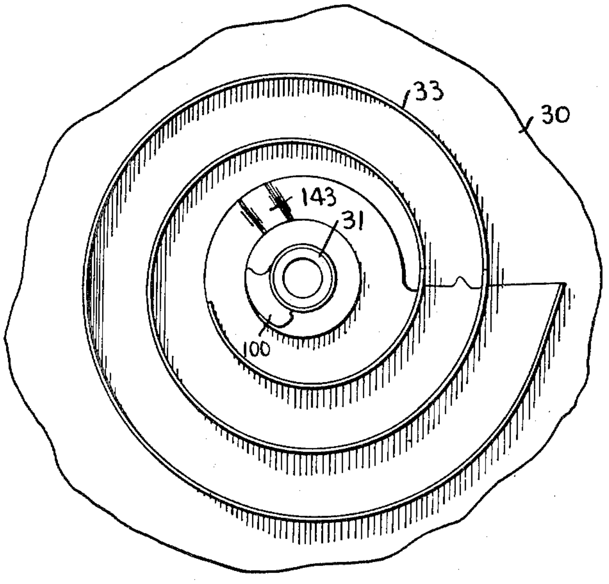
Fig. 21 is a fragmentary inverted plan view of the turntable to show the scroll on the under side thereof through which the record changing mechanism derives power from the turntable motor.

It will be recalled that the swing lever is being oscillated counterclockwise as viewed in Fig. 6 by reason of the engagement or roller 117 with driving scroll on the underside of the turntable. At the inner end of the scroll there is a cam surface 143 (Figs. 21 and 23) which functions as a resetting cam to force the roller 117 and its driving pin 116 downwardly against the compression of spring 118 to a position where the washer 115 will again be caught and held by the detent finger 114 as in Fig. 22. This detent finger is at the end of the lever 109, which was previously displaced in consequence of the manual operation of lever 94, which placed dog 106 beside margin 108 of lever 109 to be acted on by cam 100 through lever 980 as above described. In the meantime, however, the detent lever 109 has been restored to its original position by the bias of spring 112, the entire lever 109 having been transported away from the trip dog bodily by the movement of swing lever 35 upon which lever 109 is pivoted. Consequently, when the resetting cam 143 pushes the roller and pin out of the scroll, the detent is again effective to restrain these parts in their retracted position.

Figure 22:
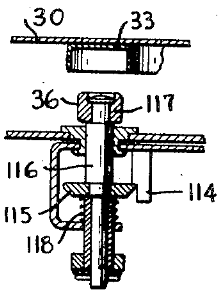
Fig. 22 is a detail view taken in section on line 22—22 of Fig. 8.

On the other side of the turntable axis, the swing lever 35 carries another driving pin 144 which mounts a cam follower roller 145 substantially identically with pin 116 and roller 117 as shown in Fig. 22. In this instance, support for the washer 146 is provided by an inclined cam flange 147 on a lever 148 also pivoted to the swing lever and biased in a clockwise direction about its pintle 149, as viewed in Fig. 8, by a torsion spring 150. The bell crank lever 148 has an arm at 151 provided with a roller 152 engageable with a fixed stop 153 mounted on the bed 26. As the swing lever 35 reaches the extreme of its movement, whereby the driving roller 37 and driving pin 116 are ejected from the scroll, the bell crank lever 148 will be oscillated counterclockwise as viewed in Fig. 8 by contact of roller 152 with fixed stop 153 whereby the detent flange 147 is moved out of engagement with the washer 146 thereby allowing this pin to be projected upwardly to engage roller 36 in the scroll. This immediately initiates a reverse movement of the swing lever 35 clockwise as viewed in Fig. 8 and the frictional engagement of its spring fingers 127 and 128 with the segment 125 of the tone arm mounting bushing 124 will impositively actuate the tone arm in a direction which is clockwise as viewed in Fig. 2, thereby tending to move its free end, and the stylus therein contained (not shown) into a proper position over the start of the record groove in the record.

Figure 13:
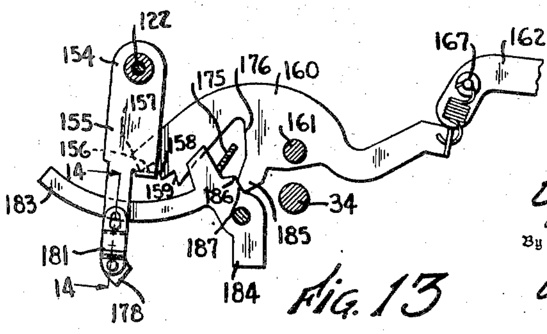
Fig. 13 (sheet 2) is a fragmentary detail view of the tone arm stop and brake mechanism.

The drive of the tone arm toward playing position is impositive in order that the tone arm may be stopped at the appropriate point. This point must be separately determined for each style of record. For this purpose, the portion 154 of clamp 125 (Fig. 9) is extended in the form of an arm 155 (Figs. 8, 12 and 13) with outwardly turned finger 156 for engagement selectively with any one of the several stop surfaces provided at 157, 158 and 159 on lever 160, these surfaces, when engaged by finger 156, being respectively adapted to define the correct tone arm angle for twelve inch, ten-inch and seven-inch records, respectively. The general arrangement is known and only the surface indicated at 159 has been added for the purposes of the present invention. The lever 160 oscillates about a pintle stud 161 to positions in which the several stop surfaces aforesaid are presented to the finger 156 according to the angular adjustment of lever 160. This adjustment, in turn, is determined in part by the position of a slide 162 (Figs. 8, 12 and 13) and in part by the upwardly projecting finger 163 on lever 164 shown in Figs. 3 and 6, as well as Figs. 8 and 12. A tension spring 165 acts on lever 160 in a direction tending to oscillate this lever counterclockwise from the position shown in Fig. 12 to that in which it is shown in Fig. 13. The spring is anchored in a guide post 167 which extends through a slot of slide 162 for the guidance thereof as shown in Fig. 12.

Reciprocation of slide 162 is controlled by pivotally connecting the remote end thereof to a lever 168 which extends up within the ejector column 42 as shown in Fig. 16 and is provided at its upper end with a pair of spaced fingers defining an intervening notch at 169 in which acts the cooperating finger 170 connected with the auxiliary head 54. When the head is lowered in the position indicated in Figs. 15 and 17, the lever 168 is oscillated clockwise as viewed in Fig. 17 whereby the slide 162 is projected to the left as viewed in Figs. 8 and 12, the movement of the slide then being such that when one lever 160 oscillates against the end of the slide, such lever will present its stop surface 158 to the finger 156 to position the tone arm for commencing the play of a ten inch record. If the auxiliary head of the ejector mechanism is raised to the position shown in dotted lines in Fig. 17 and in full lines in Fig. 6, the lever 168 will be oscillated to the dotted line position of Fig. 17, thereby somewhat retracting the slide 162 so that when lever 160 contacts with the slide it will be in a position somewhat farther in a counterclockwise direction as viewed in Fig. 13 and will present its stop surface 157 to the finger 156 to position the tone arm at the angle proper for initiating play of a twelve inch record.

Obviously, if a seven inch record is to be played, the tone arm angle to initiate play thereof, is quite radically different from the angle appropriate for starting play of a ten inch or a twelve inch record. Moreover, this difference is not one which is represented by any change in position of the auxiliary head of the ejector column, since such head is in the same position for the play of a seven inch record that it occupies for the play of a ten inch record. Accordingly, it is novel in the present invention to provide entirely distinct means for automatically fixing the new tone arm position required for seven inch records.

To this end, the lever 164 is pivoted on a bracket 172 which depends from the bed plate 26, the lever 164 extending from its fulcrum toward the turntable axis and being provided with a plate 173 in line with such axis as indicated in Figs. 3, 6, 8 and 12. A spring 174 connected in any suitable manner with the lever 164 biases such lever upwardly toward the position in which it appears in Fig. 3 so that when either of the pins 57 or 61 is inserted for playing either 33 or 45 R. P. M. seven-inch records, the finger 163 will be elevated into the path of oscillation of lever 160, as shown in Figs. 3 and 13. Thus, in the playing of a seven-inch record, whether of the small hole type such as is mounted on the post 59 of Fig. 7, or the large hole type mounted on the post 71, 72 of Fig. 3, in either case it will be the finger 163 rather than the slide 162 which will determine the position of the stop lever 160. However, when the pin 44 of post 43 is positioned for the playing of either ten or twelve inch records, the elongated flattened end portion 47 of pin 44 will project beyond the cross pin 46 to engage the plate 173 and depress lever 164 against the bias of its supporting spring, whereby to retract finger 163 from the path of stop lever 160, leaving the slide 162 to determine the position of the stop lever in accordance with prior art practices. It is to be noted that whereas in the prior art the position of the stop lever is determined incidentally to the adjustment of the auxiliary head of the ejector column, the different position required for seven inch records is determined, equally automatically, as an incident to the selection of the proper post for the playing of a seven inch, as distinguished from a ten or twelve inch record.

The tone arm is now positioned above the record at the proper angle to initiate play, but must be lowered to bring its stylus in contact with the record. It must also be freed from positive restraint by the stop surfaces 157, 158 and 159, as these surfaces are in the path in which the tone arm must move during the playing of the record. Meantime, after the restraint is removed, and pending engagement of the stylus with the record groove, it is an important feature of the invention to steady the tone arm impositively against accidental displacement from the selected angle. This is accomplished during the continued movement of the swing lever 35 consequent upon the travel of the roller 37 in the scroll 33 on the under side of the turntable. The swing arm can continue to move notwithstanding that the tone arm is locked, since the driving connection between these parts is entirely impositive and frictional, being achieved by the frictional contact of the spring fingers 127 and 128 with the segment 125, as shown in Fig. 9 and above described.

The removal of the positive stop is effected by direct engagement of the lug 175 on the swing arm with the edge surface 176 of lever 160. This lug may conveniently be struck from the swing arm, forming therein the notch indicated at 177 in Fig. 8. In the described oscillation of the swing arm in a clockwise direction as viewed in Fig. 8, the lug 175 is moving from the position in Fig. 13 to the position in Fig. 12 and in so doing has engaged the side marginal portions 176 of lever 160, swinging such lever clockwise as viewed in Fig. 12 to remove its several stop surfaces 157, 158 and 159 completely out of the path of the finger 156 of lever arm 155 which, it will be recalled, is connected to turn with the tone arm. Due to the extreme freedom of movement with which the tone arm oscillates, the tone arm would now be completely at the mercy of any vibration or gravity influence to change its position from that so accurately determined by the stop surfaces aforesaid. To prevent this, we provide on the extension 178 of arm 155 a brake shoe 180 which takes the preferred form of an upstanding post having a reduced portion, guided in a slot in arm extension 178 (Fig. 14) and subject to the bias of a spring such as the looped clock spring shown at 181 in Figs. 12, 13 and 14. Cooperating with the brake shoe is the coacting arcuate arm 183 of lever 184 which is pivoted to the underside of the bed plate. In the operative position of lever 184 in which such arm 183 bears against the spring brake shoe 180 as shown in Fig. 13, the outer margin of the lever arm is concentric with the axis upon which the tone arm oscillates. The lever 184 is pushed into this position by the aforesaid lug 175 of the swing arm 35 as the latter makes the first described oscillation to swing the tone arm free of the turntable. There is an interlock between the stop lever 160 and the brake lever 184 as shown in Fig. 13. The finger 185 of the stop lever is normally engaged above the shoulder 186 of brake lever 184 in the position of the parts shown in Fig. 12, the stop lever being thus prevented from moving into its operative stop position until the lever 175 has pushed the brake lever 184 to engage its braking arm 183 with the brake shoe 180. As soon as this has been effected, as shown in Fig. 13, the stop lever 160 drops into stop position but its finger 185 now engages the marginal surface 187 of the brake lever below its shoulder 186, as viewed in Fig. 13, so that the brake lever is locked in pressure contact with the brake shoe 180 in a position from which it cannot depart until, on the return stroke of the swing lever 35, the reengagement of lug 175 with the stop lever forces the stop lever back to the position of Fig. 12 against the bias of its spring 165, thereby, in the final movement of the swing lever, releasing the brake and relieving the pressure of the brake arm 183 on the spring shoe.

As the swing lever approaches the point where the release of frictional braking pressure is effected, the movement of the cam portion 123 of swing lever 35 beneath the thrust rod 122 is now occurring in a direction to the left, as viewed in Fig. 11, whereby such rod is gradually lowered to deposit the stylus at the free end of the tone arm on the record groove. Such deposit occurs slightly prior to the time when the finger 185 of the stop lever clears shoulder 186 to release the braking pressure as above described. The tone arm now floats entirely free and moves in response to the travel of its stylus in the record groove of the record during the entire playing of the record.

Figure 14:
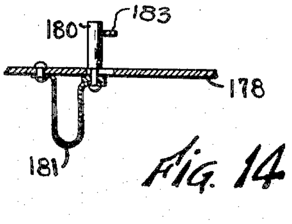
Fig. 14 is a fragmentary detail view in longitudinal section through the brake lever and spring.

While the functioning of the interlocking arrangement between the stop lever and the brake lever has been described with particular reference to the maintenance of braking pressure until the stylus can be lowered into playing position, it has been found that this interlock is also effective to overcome another difficulty experienced with prior art record changers. In previous record changers of this general type, there has been some difficulty when a record was rejected after having been played about halfway through. Under these circumstances, the arm 155 which partakes of the angular movement of the tone arm will have moved counterclockwise as viewed in Fig. 12 to a position where its finger 156 may be struck by one or another of the stop surfaces of the end of stop lever 160 upon the release of such stop lever. The stop lever is being held aside by the lug 175 on the swing arm and the first thing that happens following a rejecting operation as already described above is to initiate the movement of the swing arm by engagement of one of its actuating rollers in the scroll cam of the turntable. This causes the lug 175 to be moved to the left as viewed in Fig. 12 and it will be followed by lever 160 under the bias of spring 165. When this movement progresses sufficiently far so that the stop lever engages the finger 156, it tends to wipe the stylus across the record grooves and this is not merely noisy in the reproducing mechanism but tends to damage the record. The addition of the intervening brake lever 184 has solved this problem, since the stop lever 160 instead of following lug 175 as rapidly as such lug moves out of its path, is arrested by the interlock of finger 185 of the stop lever behind shoulder 186 of the brake lever. This arrests the movement of the stop lever until the brake lever is moved into braking engagement with the spring shoe 180, as shown in Fig. 14. Only at this time is the stop lever free for oscillation and, since this occurs only near the conclusion of swing arm movement, the tone arm and its associated lever 155 will already be swung completely out of the way to the position shown in Fig. 12. Moreover, at that time, the braking pressure has already been developed between the brake shoe and the braking arm 183. Such braking pressure continues effective during the return movement of the tone arm to playing position as determined by the stop lever. However, the braking pressure is relatively light and the frictional driving pressure of the spring fingers shown in Fig. 9 is more than adequate to cause the brake to slip until the desired position is reached.

A further major feature of the present invention is the velocity trip previously referred to. Much of the structure involved in its operation has already been described with the exception of details particularly shown in Figs. 8, 23, 24 and 25. It will be recalled in discussing the initiation of a playing cycle, reference is made to a rejecting operation involving the rotation of the cam 79 to transmit motion to levers 83, 89 and 94 to oscillate rock shaft 97 to a position where the trip dog 106 would drop from the position of Fig. 8 and Fig. 23 to lie behind lever 108. Thus, when lever 98 carrying the trip dog 106, is acted upon by the cam 100 on the turntable hub, this occurring once in each turntable rotation the trip dog 106 displaces lever 109 to release the roller 37 for upward movement into the turntable scroll and initiate oscillation of the swing arm for record changing purposes. A similar sequence of operations is achieved automatically whenever the stylus 200 (Fig. 1) at the free end of the tone arm 40, moves from the low pitch record groove portions 201 on to the relatively high pitch record groove portion 202 near the center of the record, after the conclusion of the playing of the record.

To achieve this result, the tone arm hub 124 carries at its lower end a frictionally driven arm 204 (Fig. 9), the upper surface of which contacts a bracket 205 suspended from clamp 125 to provide clearance for the operation of the cam and push rod which lift and lower the tone arm as above described. Depending from the bracket is a rod 206 carrying a spring seat 207 upon which the compression spring 208 is carried to support a friction washer 209 with the bracket 205, the arm 204 being lightly clamped between the bracket 205 and washer 209.

As the tone arm changes its angular position consequent upon the following of the record groove by the stylus, the arm 204 moves with it and, bearing against the depressed end of lever 94 as shown in Fig. 8, the tone arm movement is communicated to lever 94, this lever being free for oscillation with rock shaft 97 between the actuating fingers 92, 93 as already described.

However, it will be remembered that rock shaft 97 extends above the bed 26 and is there provided with an arm 98 having at its free end a cam follower roller 99 and having intermediate its ends the trip dog 106 which is normally engaged with the end of lever 109 but is gravity biased so that, upon clearing such lever, it will drop to the position shown in Fig. 25 for the transmission to such lever of the impulse imparted to roller 99 by cam 100 once in each rotation of the turntable.

As the stylus 200 follows the sound recording portion 201 of the record groove, the tone arm movement thus communicated through bracket 205 frictionally to the arm 204 and thence through lever 94 and rock shaft 97 to the cam follower arm 98, gradually moves the arm 98 to a position where the roller is contacted by cam 100. The relative lengths of the lever arms involved is such that the position shown in Fig. 24 is reached well before the stylus reaches the end of the transcribed portion of the record groove. From this point on until the stylus reaches the end of the portion 201 of the record groove, angular motion derived by the tone arm during each rotation of the record will be communicated through the lever system above described to move the velocity trip dog 106 slightly closer to the corner 210 which it must clear before reaching the position of Fig. 25. However, the cam 100 on the turntable hub will, in each rotation, engage the roller 99 in a direction to reverse the oscillation of the several levers, thereby moving the parts back to the position of Fig. 24, such reversal of lever movements being made possible by the fact that the lever 204 at the bottom of the tone arm hub is only lightly driven frictionally and can readily be made to yield with respect to the tone arm hub.

Thus, during approximately the last third of the period of record reproduction, each rotation of the turntable causes the trip dog to approach the corner 210 to an extent which is materially less than the initial distance of the dog from such corner. Then, in the same rotation of the turntable the engagement of the roller 99 with cam 100 pushes the trip dog back substantially to its original position. Thus, the only way in which the trip dog can ever clear corner 210 is to reach the corner by moving farther in the course of a single turntable rotation than it normally moves during record reproduction. This finally happens when the stylus reaches the high pitch portion 202 of the record groove. The relative rate of angular movement of the tone arm in the course of a single turntable rotation is thereby accelerated and the consequent increased displacement of the several levers in the motion transmission system becomes sufficient so that the trip dog reaches corner 210 of lever 109 and falls in response to its gravity bias alongside such lever before cam 100 reaches cam follower roller 99 to nudge the trip dog back to its original position. Now, when the cam 100 reaches roller 99 the effect thereof is communicated positively through the trip dog to lever 109 to release roller 37 for upward movement in the scroll 33 whereby the swing lever 35 is set in motion and a change of record is effected. As above noted, it is important that this be accomplished as a consequence of the change in angular velocity of the tone arm as distinguished from a mere change in angular position thereof, since the angular position of the tone arm is not the same at the conclusion of all records. Thus, the improvement brings about a record change immediately on the conclusion of the playing of all records, regardless of whether these are long or short as compared with the average, and it is unnecessary to provide any latitude for the accommodation of records which are unusually long. Neither is there any instance in which the reproduction of a long record is discontinued prior to the completion thereof.

As already stated, lever 94 (Fig. 8) is left entirely free for automatic operation in the functioning of the velocity trip mechanism during ordinary operation. However, such lever may be actuated manually in either direction by the long finger 92 or the short finger 93 of lever 89. For manual operation of the player mechanism, the control knob 74 is operated to the position indicated by the legend manual in Fig. 2 and this transmits motion through the cam lever 79 and lever 83 to lever 89, causing the long finger 92 to positively engage lever 94, thereby moving such lever to its inoperative position and rendering the automatic trip mechanism inoperative.

In the reject position of the control knob, the short finger 93 engages a leaf spring 212 beneath lever 94 (Fig. 26) to displace this lever impositively so that if the knob is held in the "reject" position, no binding or dallying of the parts will occur during the ensuing changing operation.

We claim:

1. A record changing phonograph of the type comprising a turntable, a tone arm mounted for vertical and lateral movement to and from playing position, and means for returning the tone arm toward playing position and including a positive stop for defining the starting position thereof, the combination with said tone arm and a control member connected to partake of its lateral oscillation, control means for advancing and retracting said positive stop, the retraction of said stop leaving said tone arm entirely free during record reproduction, and a friction brake including a part mounted on said control member and a relatively stationary part, and means rendering said brake operative during at least part of the interval between the retraction of the stop and the initiation of record reproduction, said means being actuated by said control means and including brake releasing mechanism for completely freeing said member of the influence of said brake preliminary to record reproduction.

2. In a device of the character described, the combination with a record reproducing tone arm mounted for lateral swinging movement, of an arm connected therewith to partake of such movement and a stop removably disposed in the path of said arm, a segment disposed adjacent the path of oscillation of said arm, a brake shoe mounted on said arm and with which said segment is engageable, and means for effecting relative brake control movement between said segment and shoe for frictionally stabilizing said arm and tone arm, said means comprising means for sequentially applying said brake, removing said stop from the path of the arm, releasing said brake and moving said tone arm into reproducing position.

3. In a record changing phonograph, the combination with a tone arm mounted for lateral and vertical movement and provided with means for actuating it laterally and vertically from and to reproducing position, of positive stop means mounted for advance and retraction into the path of tone arm oscillation laterally toward reproducing positions, motion transmitting connections for retracting said positive stop means preliminary to the lowering of said tone arm toward reproducing position, friction brake means including first and second parts, the first part being connected to the tone arm, and means for engaging said parts during at least part of the retraction of said stop means while the tone arm is in the angular position fixed by said stop means and for disengaging said parts preliminary to the operation of the tone arm, in further combination with an interlock between said stop means and said brake means, said interlock comprising a part on said stop means and a part on the second part of the brake means which are engaged during retraction of said stop means to preclude disengagement of said brake means until said parts are moved out of engagement by movement of the stop means whereby the disengagement of the stop means is a prerequisite to the release of the brake means.

4. In a phonograph record changer of the type having a turntable, an escapement including an offset stand having a seat, an ejector, and a shouldered post mounted centrally of the turntable for the support of disk records of one size on said shoulder and on said stand seat adjacent said ejector for simultaneous ejection of a record from said shoulder and stand seat onto said turntable, the improvement comprising an auxiliary head mounted on said stand for pivotal movement between a retracted position and an advanced position beyond said stand seat in which said auxiliary head substitutes for said stand seat in cooperating with said shoulder for the support of disk records of a smaller size, said auxiliary head being provided with a shelf and a slide engageable by said ejector to transmit motion therefrom to disk records thus supported for ejection therefrom, said auxiliary head being provided with a second shelf offset vertically from said shelf to receive the margin of a disk record of still different size, said slide being provided with lugs spanning said vertical offset to engage records on said second shelf for ejection thereof by the same mechanism which ejects the disk records first mentioned.

References Cited in the file of this patent

UNITED STATES PATENTS

| | | |
|---|---|---|
| 1,568,130 | Blackwell | Jan. 5, 1926 |
| 1,938,810 | Collison et al. | Dec. 12, 1933 |
| 2,519,579 | Johnson | Aug. 22, 1950 |
| 2,521,990 | Metcalfe et al. | Sept. 12, 1950 |
| 2,545,359 | Johnson | Mar. 13, 1951 |
| 2,545,643 | Bender | Mar. 20, 1951 |
| 2,549,246 | Schweitzer | Apr. 17, 1951 |
| 2,650,831 | Fortune et al. | Sept. 1, 1953 |

FOREIGN PATENTS

| | | |
|---|---|---|
| 459,208 | Great Britain | Jan. 4, 1937 |
| 551,388 | Great Britain | Feb. 19, 1943 |